Oct. 19, 1926.

L. WOLF 1,604,009

CUSHIONING ATTACHMENT FOR MOTOR VEHICLES

Filed Feb. 16, 1923     2 Sheets-Sheet 1

LINUS WOLF
INVENTOR

BY Victor J. Evans
ATTORNEY

Oct. 19, 1926.
L. WOLF
1,604,009
CUSHIONING ATTACHMENT FOR MOTOR VEHICLES
Filed Feb. 16, 1923    2 Sheets-Sheet 2
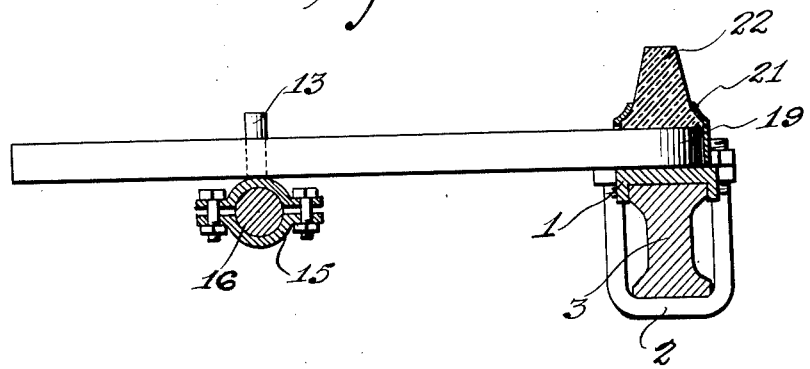
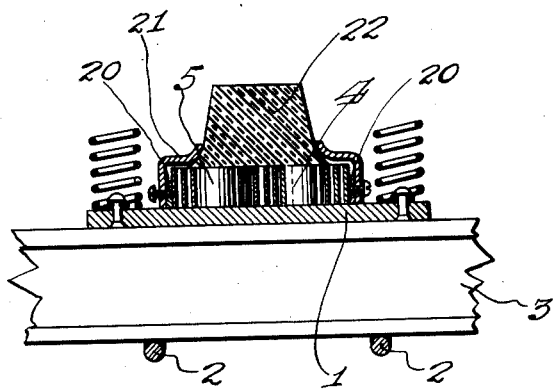
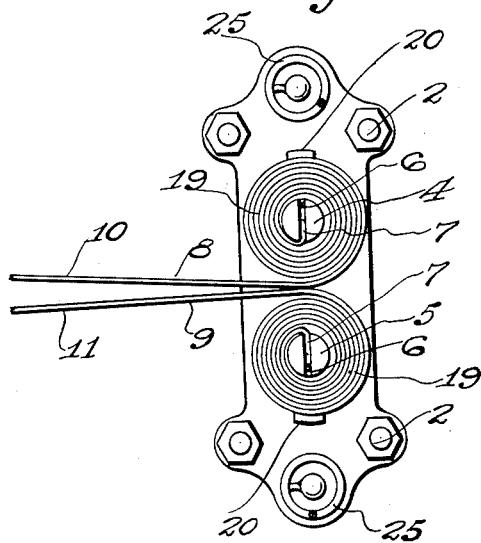
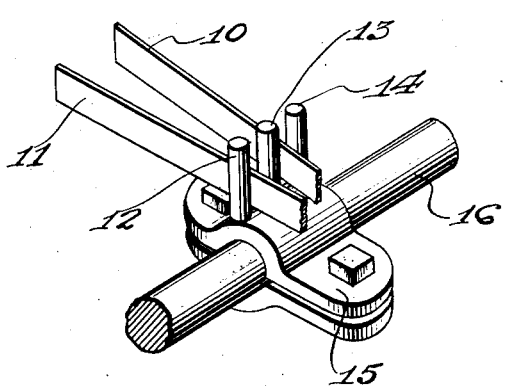
LINUS WOLF, INVENTOR
BY Victor J. Evans
ATTORNEY Patented Oct. 19, 1926.

1,604,009

UNITED STATES PATENT OFFICE.

LINUS WOLF, OF KANKAKEE, ILLINOIS.

CUSHIONING ATTACHMENT FOR MOTOR VEHICLES.

Application filed February 16, 1923. Serial No. 619,422.

This invention relates to an attachment for motor vehicles, and an object of the invention is to provide a cushioning attachment particularly designed for use on "Ford" automobiles, motor trucks, or the like for cooperating with the front spring in cushioning downward movement of the front end of the motor vehicle.

Another object of the invention is to provide an attachment as specified which also embodies means for steadying the front steering wheels of the vehicle and prevent excessive wabbling of the wheels when traveling over a rough surface, which means is also designed to substantially maintain the motor vehicle on the road or traveling in a straight line in case some parts of the steering mechanism should become broken.

Other objects of the invention will appear in the following detailed description taken in connection with the accompanying drawings wherein:—

Fig. 3 is a vertical section on the line 3—3 of Fig. 2.

Fig. 4 is a fragmentary vertical section on the line 4—4 of Fig. 2.

Fig. 5 is a plan view of the attachment having a part thereof removed.

Fig. 6 is a fragmentary perspective view of a part of the attachment.

Figure 1:
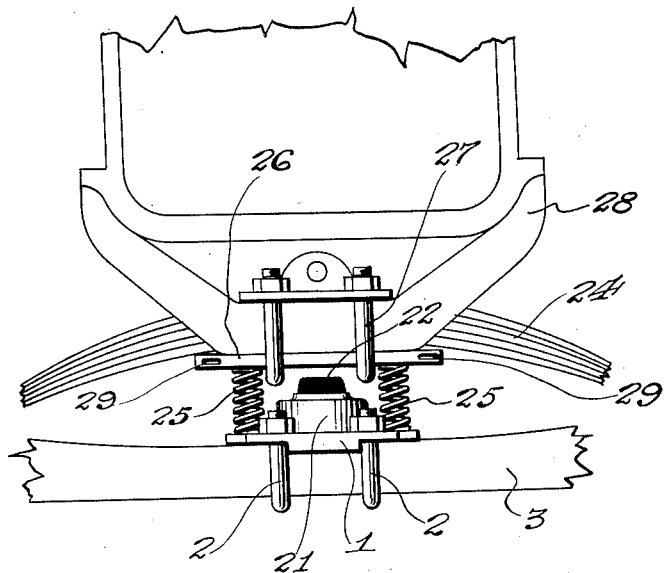
Fig. 1 is a front elevation of the improved attachment showing it applied.
Figure 2:
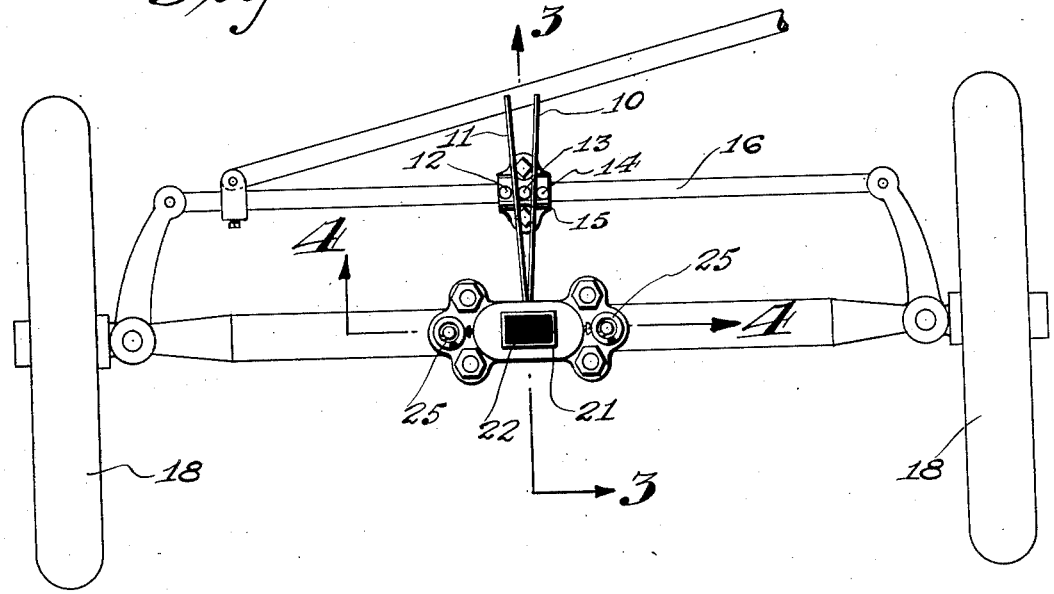
Fig. 2 is a top plan of the attachment showing it applied.

Referring more particularly to the drawings, the improved attachment comprises an attaching plate 1 which is connected by means of U shaped bolts 2 with the front axle 3 of a motor vehicle. The supporting attaching plate 1 has studs 4 and 5 formed thereon and projecting upwardly therefrom, which studs are cylindrical in shape and split diametrically, as shown at 6 to provide slots for receiving the ends of the flat springs 8 and 9. The springs 8 and 9 are coiled about the studs 4 and 5, as clearly shown in Figs. 4 and 5 of the drawings, and they extend tangentially from their outermost convolution rearwardly. The rearwardly extending ends 10 and 11 respectively of the springs 8 and 9 diverge, and engage between the up-standing tongues 12, 13 and 14 of the member 15. The member 15 is mounted upon the cross rod 16 of the steering mechanism of the vehicle and is held thereon by means of a set screw 17. The ends 10 and 11 of the springs 8 and 9 are evenly tensioned so as to prevent longitudinal movement of the cross rod under the engagement of the wheels 18 of the vehicle with rough places in a road surface, thereby steadying the steering wheels 18 and preventing excessive wabbling of the wheels when traveling over rough road-ways.

The convolutions 19 of the springs 8 and 9 are confined, between each other, the posts and up-standing blocks 20 which are formed upon the attaching plate 1 and serve not only to confine the convolutions 19 of the springs, but also serve to permit attachment to the attaching plate 1 of the spring enclosing housing 21, which carries a cushioning block 22. The cushioning block 22 is formed of rubber or any analogous material and is positioned beneath the front spring 24 of the vehicle with which the device is equipped, so that as the front of the vehicle moves downwardly, the downward action will be cushioned by the cushioning block 22. The cushioning block 22 is substantially frusto pyramidal in shape and its base enlarges at a greater angle than the major portions of its sides so as to permit confinement of the block within the housing, as shown in Fig. 4 of the drawings. The cushioning block 22 rests upon the convolutions 19 of the springs 8 and 9.

Spiral springs 25 are carried one at each end of the attaching plate 1, and they are connected to the attaching plate, in any suitable manner, preferably, so as to permit sliding engagement between the ends of the springs and the attaching plate. The springs 25 are connected at their upper ends, to a second attaching plate 26 which is attached by means of U shaped bolts 27 to the front structure of the motor vehicle or to the spring saddle 28.

The attaching plate 26 is provided with suitable slots 29 adapted to permit the attachment thereto of the usual license plate issued by the various States of the Union, which will permit the license plate to hang down in front of the springs 25 and cushioning block 22 for forming a protector for the springs and block and also for hiding them from view.

It is, of course, to be understood that the invention may be constructed in other manners and the parts associated in different relations and, therefore, I do not desire to be limited in any manner except as set forth in the claims hereunto appended.

Having thus described my invention what I claim is:

1. An attachment of the class described including a base member, studs extending upwardly from the base member, resilient elements each having an end portion coiled around and interfitting with the studs, and opposite end portions extending away from the studs in parallel relation with respect to each other, a cushion supporting member attached to the base member and providing a housing for the resilient elements, and a cushioning member carried by the cushion supporting member and overlying the coiled end portions of the resilient elements for retaining the end portions in said interfitting relation with respect to the studs.

2. An attachment for motor vehicles comprising a base plate, studs upstanding from the base plate each provided with a slot and spring elements having angularly disposed ends seated in the slots of the studs and a housing directly attached to the base and confining said angularly disposed ends in said stud slots.

In testimony whereof I affix my signature.

LINUS WOLF.